Figure 1:
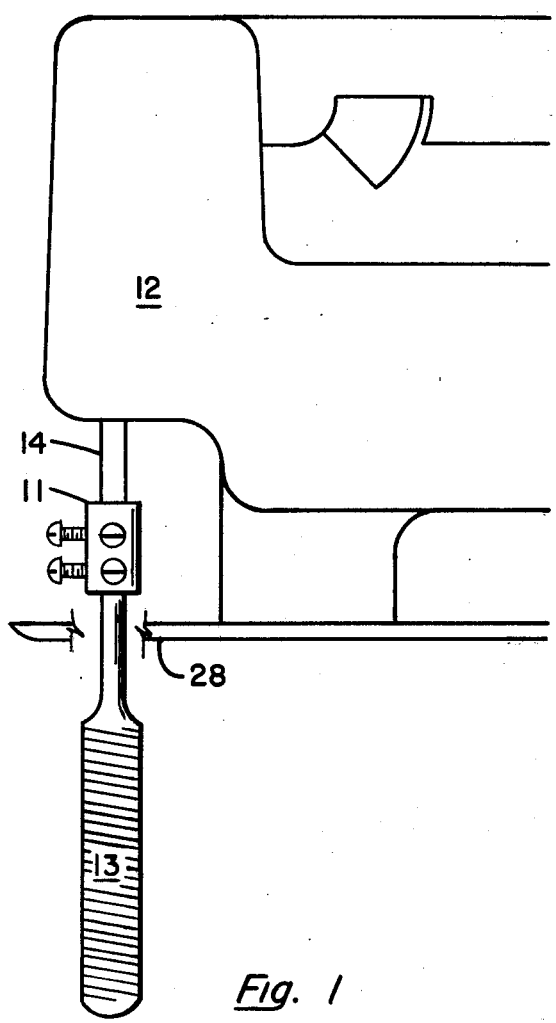

United States Patent [19]

Felpel

[11] 4,365,397
[45] Dec. 28, 1982

[54] FILE TOOL ATTACHMENT

[76] Inventor: Glenn D. Felpel, 4917 Macmont Cir., Powell, Tenn. 37849

[21] Appl. No.: 194,887

[22] Filed: Oct. 7, 1980

[51] Int. Cl.³ .................... B23D 71/00; B23D 71/02
[52] U.S. Cl. .................................... 29/76 R; 30/122; 30/392; 83/698; 279/1 A; 279/83
[58] Field of Search ............... 29/76 R, 76 A, 76 B, 29/78, 80; 30/122, 392; 83/698; 279/1 R, 1 A, 83; 408/226, 239

[56] References Cited

U.S. PATENT DOCUMENTS

| | | | |
|---|---|---|---|
| 75,402 | 3/1868 | Fiedler | 29/76 R |
| 364,743 | 6/1887 | Woods | 279/83 X |
| 739,570 | 9/1903 | Woods | 29/80 |
| 1,377,418 | 5/1921 | Krogh | 279/83 X |
| 1,856,406 | 5/1932 | Wyrkk | 408/226 |
| 2,197,626 | 4/1940 | Von Scheven | 29/76 R |
| 2,735,685 | 2/1956 | Karr | 30/392 |
| 2,893,274 | 7/1959 | Mueller et al. | 408/239 |
| 2,962,798 | 12/1960 | Gaskins | 29/76 R |
| 2,985,899 | 5/1961 | Elliott | 408/239 |
| 3,299,760 | 1/1967 | Cobb, Jr. | 83/698 |
| 3,754,330 | 8/1973 | Anderson et al. | 83/698 |
| 3,781,025 | 12/1973 | D'Angelo | 83/698 X |
| 3,867,747 | 2/1975 | Lee | 29/76 R |
| 4,083,112 | 4/1978 | Palm | 279/83 |

Primary Examiner—Leonidas Vlachos
Assistant Examiner—Jerry Kearns

[57] ABSTRACT

This disclosure concerns the adaption of power means to the operation of filing. Provided is a file tool which is supported and reciprocated by a file tool adapter which in turn is connected in rigid manner to the reciprocating bar of a power device for converting rotary motion to reciprocating motion. A second embodiment, the file tool and adapter being constructed unitary.

4 Claims, 5 Drawing Figures

U.S. Patent Dec. 28, 1982 4,365,397

FILE TOOL ATTACHMENT

This invention relates to improvements to the adaption of mechanical means to filing operations, and more particularly to versatility of application and adaption of said filing operations to commercially available portable power machines.

In many situations it has heretofore been a difficult, time consuming, and physically tiresome task to perform certain filing operations using hand operated filing tools. Power means for filing operations are not known to be available for most filing jobs. Therefore, owing to the physically demanding nature of hand filing, grinding wheels and grinding disks have been substituted in situations which should have been filing operations. However, grinding operations generally are hazardous to eyesight due to the high velocity of tiny fragments of displaced materials. There is also a hazard of coming in contact with the grinding disk or wheel which rotates at very high velocity. These grinding wheels and disks are difficult to control, especially for accurate work or for small work pieces. Also, they can not be used in corners, close quarters or near obstructions. Accordingly, it is the objective of this invention to overcome the aforementioned difficulties and problems.

It is the object of this invention to provide durable, reliable, and readily available power means to filing operations. It is another object of this invention to economically provide power means to filing operations through the adaption to commercially available power devices. It is another object of this invention to provide for removal of materials by filing in a very safe and efficient manner. It is another object of this invention to eliminate the drudgery of hand filing operations.

Figure 2:
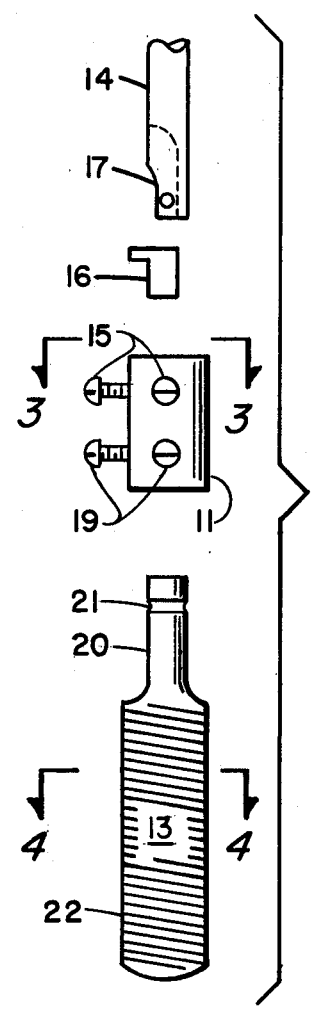
Figure 3:
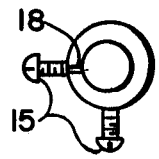
Figures 4A, 4B, 4C, 4D, 4E:
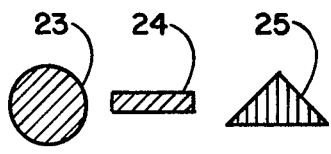
Figure 5:
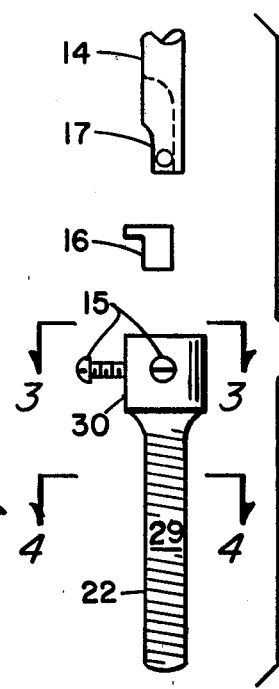

Other objects and advantages of this invention will further become apparent hereinafter and in the drawings, in which: p FIG. 1 is a view in side elevation of the instant invention attached to a power device for reciprocating the filing tool, FIG. 2 is an exploded elevational view showing the connectivity of the constituent parts of the instant invention, FIG. 3 is a top view taken substantially along line 3—3 of FIG. 2 and FIG. 5, FIG. 4a, FIG. 4b, FIG. 4c, FIG. 4d, and FIG. 4e are each a cros-sectional view taken substantially along line 4—4 of FIG. 2 and;

FIG. 5 each showing a representative tool body configuration, and

FIG. 5 is an exploded elevational view showing the connectivity of the single unit attachment.

In describing the preferred embodiment of the invention illustrated in the drawings, specific terminology will be resorted to for the sake of conciseness and clarity. However it is not intended to be limited to the specific terms so selected, and it is to be understood that each specification includes all technical equivalents which operates in a similar manner to accomplish a similar purpose. In particular the term sabre saw as used herein is intended to include the portable jig saw, reciprocating saw, scrool saw, and the like. Also the term filing operation as used herein is to include rasping, smoothing, polishing, and the like.

Referring more particularly to the disclosure in the drawings, a tool adapter assembly constructed in accordance with the instant invention is generally shown at 11. A sabre saw power device for converting rotary motion to reciprocating motion for reciprocating the tool adapter assembly is generally shown at 12. A file tool which is supported and reciprocated by the tool adapter assembly is generally shown at 13.

The sabre saw power device 12 includes a reciprocating bar 14 extending from the body of 12. The tool adapter device 11 includes set screw generally indicated at 15 for clamping and connecting adapter 11 to bar 14 in a rigid manner. The adapter device 11 being of such shape and dimension as to accept and be compatible with the configuration of bar 14. Set screws 15 may be a self restraining type to prevent backing out during use due to the vibrations of the system. The adapter may also include spacer 16 which maintains adapter 11 to bar 14 angular alignment and prevents damage by clamping screw 15 to blade slot 17 in bar 14. The body of spacer 16 shall be of configuration and thickness such that it will be compatible with blade slot 17. Spacer 16 may be press fit into slot 18 of adapter 11. The fit should be a light press fit. This press fit will help prevent inadvertent loss of spacer 16 when adapter 11 is disassembled from the power device and still allow the spacer to function properly. Set screw 19 for connecting the shank 20 of tool 13 in rigid manner into the adapter 11 may also be self restraining type.

The shank 20 of tool 13 may be provided with a circumferential locking groove shown at 21. Locking groove 21 provides for positive locking in the axial direction between adapter 11 and tool 13. Positive locking is accomplished by using oval point set screw 19 which engages groove 21. For large configurations of tool 13 the locking groove may be required to provide adequate restraint since the holding power of set screw 19 may be exceeded.

The body 22 of file tool 13 is of blunt design. That is, the cross-sectional shape of the body is constant along its longitudinal axis. Several possible cross-sectional configurations of body 22 are shown in FIG. 4. Round files 23 being circular are particularly well suited for enlarging holes, shaping curves or making slots. The flat file 24 being rectangular is used primarily for general utility work. The three square file 25 having triangular shape is useful for cutting accurate internal angles and for sharpening saw teeth or for sharpening other tools. The square file 26 having a square section is useful for cutting keyways, slots, and for general utility filing where a heavy section is required. The half-round file 27 having a circular segmental section is used to enlarge round openings, shaping curves and for general utility work.

The dimensions of shank 20 and body 22 being substantial in all directions perpendicular to the longitudinal axis allows for file cutting in any chosen direction perpendicular to this axis thus enhancing maneuverability. The length and cross-sectional dimensions of the body 22 of tool 13 shall be designed for convenience of operation, and for the intended use.

The cut of the teeth on body 22 of tool 13 are designed for the specific material and finish for which the tool is intended. The cut refers to the character and coarseness of the file teeth. These teeth may be designed for removal of metals, wood, plastic, leather or other materials. The teeth may be designed for rapid removal of materials without clogging or they may be designed for a very smooth and polished surface. The teeth cut on the body 22 are also designed for file cutting on the toward shank 20 stroke of the tool 13. In other terms the teeth are designed to act in the toward base 28 stroke of bar 14. This toward base 28 cutting action is required to prevent excessive vibration and bounce of the device. In this way the teeth tend to push the work piece against the base on the file cutting stroke of operation. The body 22 may also be surface coated with an abrasive substance for filing instead of having a teeth.

A file tool which is supported and reciprocated by bar 14 is generally shown at 29. The shank end 30 of tool 29 being of such shape and configuration as to accept bar 14. Tool 29 includes clamping screws 15 for connecting tool 29 to bar 14 in rigid manner. Tool 29 may also include spacer 16. The body 22 being of cross section and having teeth design as previously discussed.

In operation bar 14 of sabre saw power device 12 is driven back and forth to which adapter 11 is rigidly connected and therefore also driven back and forth. The shank of tool 13 is rigidly attached to the adapter and is therefore driven in reciprocating motion for the performance of filing action on the toward base 28 stroke of filing tool 13.

There are several advantages of this invention, the most important being the inherent safety and efficiency of the operation of filing. This method of removal of materials, where it can be applied, is by far less hazardous than grinding wheels and grinding disks which are commonly used. And through the use of this invention the drudgery of hand filing is virtually eliminated. Filing operations will therefore be utilized on a larger scale in the home and commercial workshop.

Control and accuracy in filing operations is considerably improved by the use of this invention since the operator can hold the body of the power device 12 stationary and at proper orientation to the work piece as file tool 13 is reciprocated. For even more accurate filing operations this invention can be connected to a sabre saw power device 12 which in turn may be mounted on a table device (not shown) for supporting the sabre saw power device in secure fashion. This application is particularly well suited to sharpening saw teeth or filing operations on small items where the operator can guide the work piece on the reciprocating file tool 13.

The invention has been described in an illustrative manner, and it is to be understood that the terminology which has been used is intended to be in the nature of words of description rather than limitation.

Obviously, many modifications and variations of the present invention in addition to what is shown are possible in light of the above teachings. It is therefore to be understood that within the scope of the appended claims, the invention may be practiced otherwise than specifically described.

Having thus disclosed the invention I claim:

1. An attachment for commercially available sabre saw power device said device having a power driven reciprocating bar, comprising a tool adapter of configuration to engage said bar and acting in cooperation with and substantially coaxial with said bar, means for clamping said adapter to said bar in rigid manner, a spacer member being substantially rectangular of thickness and configuration such as to conform to a slot in said bar and being provided with a tab which engages in tight fit a slot provided in said adapter, means for clamping said file tool in rigid manner to said adapter.

2. An attachment for commercially available sabre saw power device said device having a power driven reciprocating bar, comprising a tool adapter of configuration to engage said bar acting in cooperation with and subtantially coaxial with said bar, means for clamping said adapter to said bar in rigid manner, a spacer member being substantially rectangular of thickness and configuration such as to conform to a slot in said bar and being provided with a tab which engages in tight fit a slot provided in said adapter, a file tool acting substantially coaxial and in cooperation with said adapter and having a shank of configuration such as to engage said adapter and having a body portion said body having filing teeth with said filing tool having tooth cut and body cross-sectional configuration for intended use, means for clamping said file tool in rigid manner to said adapter.

3. An attachment for commercially available sabre saw power device said device having a power driven reciprocating bar, comprising a tool adapter of configuration to engage said bar acting in cooperation with and substantially coaxial with said bar, means for clamping said adapter to said bar in rigid manner, a spacer member being substantially rectangular of thickness and configuration such as to conform to a slot in said bar and being provided with a tab which engages in tight fit a slot provided in said adapter, a file tool acting substantially coaxial and in cooperation with said adapter said tool having a body portion said body having filing teeth with said filing tool having tooth cut and body cross-sectional configuration for intended use, a shank portion having diameter at outer end and inner end substantially the same and having smaller diameter substantially at center of said shank thereof providing a circumferential locking groove, means for clamping said file tool in rigid manner to said adapter said clamping means engaging said locking groove.

4. A filing tool attachment for commercially available sabre saw power device said device having a power driven reciprocating bar, comprising a file tool adapter of configuration to engage said bar acting in cooperation with and substantially coaxial with said bar, set screw of size and location in said adapter to engage configuration of said bar, a spacer member being substantially rectangular of thickness and configuration such as to conform to a slot in said bar being provided with a tab which engages in tight fit with a slot provided in said adapter, a file body acting substantially coaxial and in cooperation with said bar and (being attached) means for attaching said file body to said adapter in rigid manner, said file body having filing teeth cut and cross-sectional configuration for intended use.

* * * * *